United States Patent
Poston

(10) Patent No.: US 8,496,507 B2
(45) Date of Patent: Jul. 30, 2013

(54) SELF-TRACKING SWIFTWATER RESCUE BOARD

(76) Inventor: Terry W. Poston, Beulah, MI (US)

( * ) Notice: Subject to any disclaimer, the term of this patent is extended or adjusted under 35 U.S.C. 154(b) by 166 days.

(21) Appl. No.: 12/818,266

(22) Filed: Jun. 18, 2010

(65) Prior Publication Data

US 2011/0312234 A1 Dec. 22, 2011

(51) Int. Cl.
*B63C 9/00* (2006.01)

(52) U.S. Cl.
USPC ............................................................ 441/80

(58) Field of Classification Search
USPC ................... 441/79–88; 5/625–629; 114/253
See application file for complete search history.

(56) References Cited

U.S. PATENT DOCUMENTS

| | | | | |
|---|---|---|---|---|
| 4,461,115 A | * | 7/1984 | Carrillo | 43/43.13 |
| 4,464,858 A | * | 8/1984 | Wright | 43/43.13 |
| 4,763,437 A | * | 8/1988 | Cuda | 43/43.13 |
| 6,641,446 B1 | * | 11/2003 | Bentley | 441/82 |
| 2006/0191458 A1 | * | 8/2006 | George | 114/253 |

FOREIGN PATENT DOCUMENTS

CA 2439871 A1 * 3/2005

OTHER PUBLICATIONS lifesled.com, Lifesled Product, Lifesled LS1 and LS2, 2008, 2 pages, www.lifesled.com, U.S.
NRS Rescue, River Boards, NRS Rescue Board, 2008, 1 page, www.nrsrescue.com, U.S.

* cited by examiner

*Primary Examiner* — Lars A Olson
*Assistant Examiner* — Anthony Wiest
(74) *Attorney, Agent, or Firm* — Northern Michigan Patent Law, PLC

(57) ABSTRACT

A swiftwater rescue board capable of traveling across a river or other current flow under guidance of a single land-based rescuer using a single line. The board has a generally planar, double-ended flotation body with a longitudinal fin offset to the "victim" side of the board's centerline, and line attachment points located adjacent the ends of the board and offset to the "rescuer" side of the board's centerline. The board is placed in a river with the fin generally aligned with the current and closer to the victim being rescued, with a line attached to the attachment point at the upstream end of the board. The rescuer stays on land or in a relatively safe location and pays out line in a manner allowing the board to be driven across the river diagonally to the victim, driven only by the current flow.

14 Claims, 3 Drawing Sheets

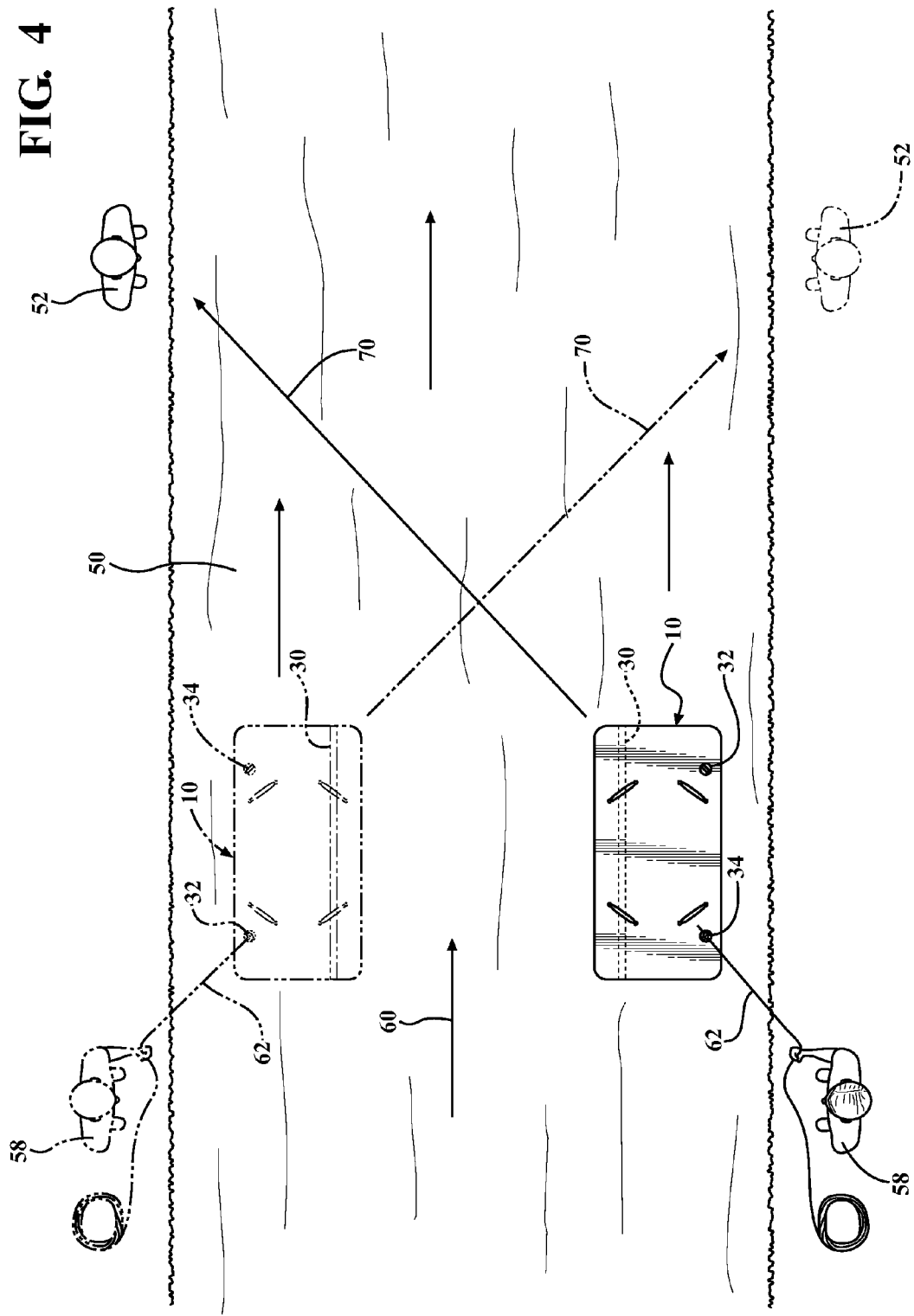

SELF-TRACKING SWIFTWATER RESCUE BOARD

RELATED APPLICATIONS/PRIORITY BENEFIT CLAIM

N/A

FIELD

The subject matter of the present application is in the field of "swiftwater rescue" boards.

BACKGROUND

Swiftwater rescue is a subset of technical rescue, involving the use of specially trained personnel and equipment to rescue or retrieve people stranded in (or on the opposite side of) swiftly moving water. A typical rescue situation involves rivers swollen by flooding, but could involve crossing any body of water with a similar directional current that must be crossed (hereafter "river"). The pressure of the moving water, usually greater midstream than along the banks or shoreline, makes such rescues difficult and dangerous.

Trained rescuers generally prefer to make "throw" rescues using throw bags or other throw devices to carry a rescue line to a victim. Some rescues are "row" rescues using a tethered boat. When neither a "throw" nor "row" rescue is practical, a tethered rescuer often enters the river in a "live bait" rescue, swimming a line or a floating rescue board to a stranded victim. In "live bait" rescues it appears to be common for rescuers to first build a special safety structure comprising ropes or cables and other mechanical devices across the river to provide tether points for rescue swimmers and rescue boards.

The foregoing methods and equipment are known for being complex, equipment-intensive, and often slow to implement. They require substantial manpower, usually involving teams of rescuers, and significant training. And to the extent that they require a rescuer to enter the water, they can be dangerous for the rescuer.

Prior rescue boards used for swiftwater rescue appear to be essentially longer, thicker, more-protective versions of swimmers' kickboards, with the addition of tether points and multiple handles. Their design assumes that a rescue swimmer will enter the water with the board, often jumping in or riding on top of it, in order to swim the board to a victim.

BRIEF SUMMARY

I have invented a swiftwater rescue board that can be delivered across swiftly moving water at the end of a single line, without the need for putting a swimmer in the water to guide the board to the victim.

My rescue board comprises a floating board with a generally planar board body, first and second ends, a victim side, a rescuer side, upper and lower surfaces, a victim-side off-center longitudinal fin, and a rescuer-side off-center line attachment point at or near each of the ends of the board. "Victim-side" means that the fin is located to the side of the board's centerline closer to a victim to be rescued from across the river when the board is placed in the river with the fin aligned with the current flow. "Rescuer-side" means that the line attachment point is located to the side of the board's centerline closer to the rescuer when the board is placed in the river with the fin aligned with the current flow.

In use, a line is attached to the line attachment point at whichever end of the board is "upstream" relative to the current when the fin is aligned with the current and the board is oriented with the offset fin closer to the victim-side of the river than to the rescuer-side. The rescuer remains on or near the riverbank or at some other safe location on the rescue side, holding the end of the line and maintaining enough tension on the line while paying it out to allow the board to cross the river diagonally, driven by the current.

While my invention is primarily intended for rescue boards of a size designed for the rescue of a single individual per board, it would be possible to vary the size and shape of the board to carry multiple people, including both rescuers and victims and their equipment. It is even believed possible to make my rescue board large enough to function as a ferry for people, equipment and vehicles, for example for military use in crossing rivers without a bridge.

These and other features and advantages of the invention will become apparent from the detailed description below, in light of the accompanying drawings.

BRIEF DESCRIPTION OF THE DRAWINGS

FIG. 4 is similar to FIG. 3, but shows the rescue board and the rescuer in phantom lines on the other side of the river, to illustrate a change in the line attachment point corresponding to the different direction of flow relative to the board's direction of travel across the river.

DETAILED DESCRIPTION

Figure 1:
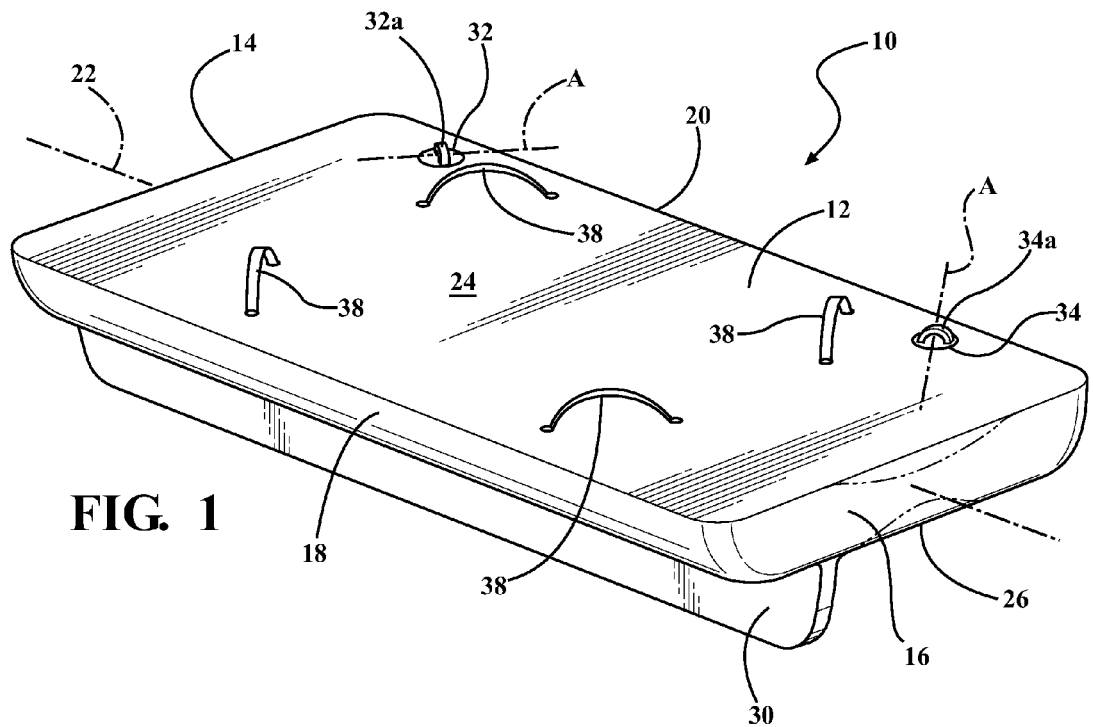
FIG. 1 is a perspective view of an illustrated example of a rescue board according to my invention.
Figure 2:
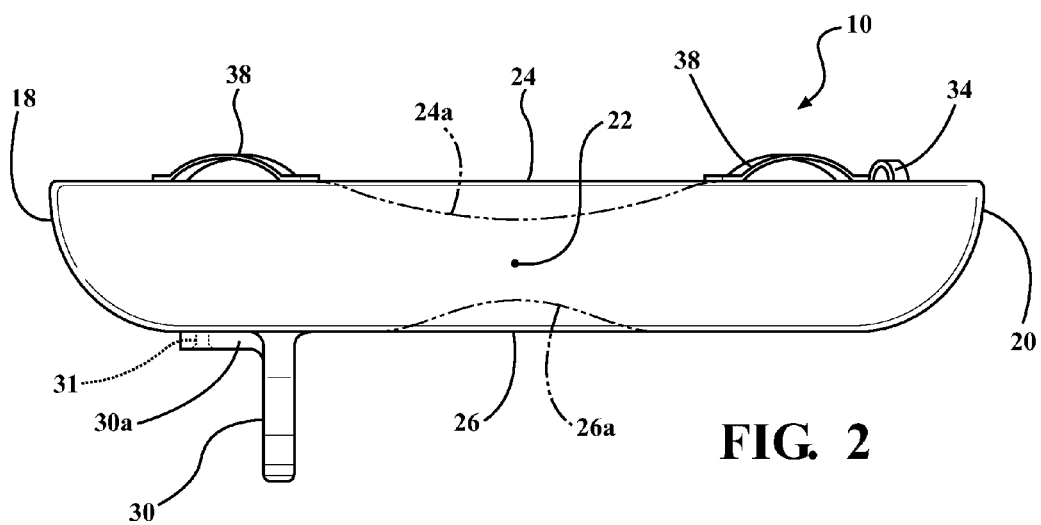
FIG. 2 is an end view of the rescue board of FIG. 1.

Referring first to FIGS. 1 and 2, a rescue board 10 according to my invention is shown in an exemplary and presently preferred form in order to teach how to make and use the claimed invention. Board 10 has a substantially planar board body 12 made from any material or structure that allows the board to float, and that additionally gives sufficient flotation for any rescuer, victim, and/or equipment intended to be floated on top of the board. A suitable material for individual rescue boards is believed to be commercially available Ethafoam™ polyethylene foam, using known foam molding and curing processes, and there should be many suitable moldable foams and polymer materials known to those skilled in the art that would provide sufficient flotation and equivalent function. An alternative may be a floating structure such as a hollow plastic material with one or more flotation chambers built into the body 12. The method of manufacture and the material and structure used to achieve flotation can vary, provided that board 10 has sufficient flotation to float itself and any people and/or equipment crossing a river on the board.

Board body 12 is shaped into a form suitable for rescue, and will generally be longer than it is wide, with a longitudinal axis or centerline 22 about which the mass of the board is generally balanced for stability in the water. Board body 12 therefore has a first end 14, a second end 16, a victim side 18, a rescue side 20, a centerline 22, an upper surface 24, and a lower surface 26. First and second ends 14 and 16 are preferably identical, and board body 12 is preferably symmetrical about centerline 22, in order to make the board equally useable no matter which way the current is flowing relative to the rescuer and victim.

A longitudinal fin 30 is securely attached to the bottom surface 26, for example molded integrally with the board material, insert-molded into the board body, or mechanically or adhesively fastened. In the illustrated example, a flange 30a extending from one side of the fin 30 is secured to the bottom of the board with cap screws 31. Fin 30 extends along a substantial portion of the length of board 10, for example half or more of the board's length, although the proportion may vary depending on the shape, length, weight, bottom contour and other features of the board body 12. FIG. 2 shows optional upper and lower surface contours 24a and 26a molded or otherwise formed in the upper and lower surfaces of the board for passenger/equipment stability (24a) and water performance (26a). The location, shape, and number of any such contours may vary.

Line attachment points 32 and 34 are located at or near the ends 14 and 16 of board 10, respectively, preferably on upper surface 24 but it may be possible or desirable to place line attachment points on the lower surface 26 or on the edges of the board. Wherever located, line attachment points are offset to the rescuer side 20 of the board, on the opposite side of centerline 22 relative to fin 30. Line attachment points 32 and 34 may be any structure capable of securing a line to board 10 by tying, clipping, or otherwise, including but not limited to eyelets, hooks, cleats, grommets, loops, or simple holes in the board. In the illustrated example, line attachment points 32 and 34 comprise raised plastic eyelets set into the upper surface of board 10, the axis A of each eyelet set at a 45-degree angle. A rescue line secured to the angled eyelet tends to be aligned by the body 32a or 34a of the eyelet at a 45-degree angle to the board's centerline 22 while the current drives board 10 across the river, provided the line is kept under tension by the rescuer.

Board 10 may optionally and preferably have one or more handles 38 secured at various locations on the board, useful for rescuers and victims alike.

Figure 3:
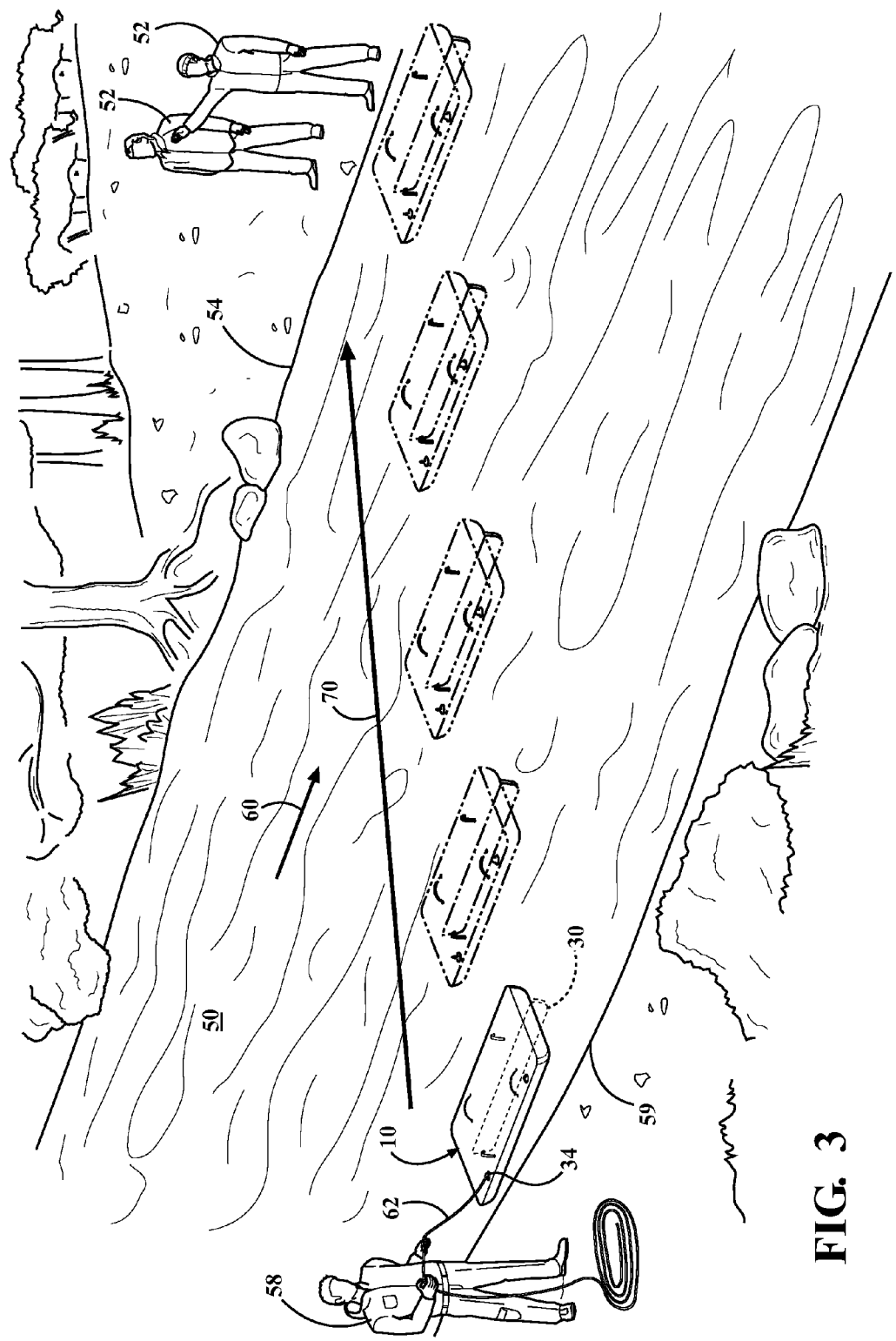
FIG. 3 is a schematic plan view illustration of a rescue staged across a river, with the rescue board of FIG. 1 shown in a launch position on one side of the river (solid lines) and subsequently moving toward one or more victims stranded on the other side (phantom lines).

FIG. 3 schematically illustrates a rescue using board 10, across a river 50. One or more victims 52 wait to be brought from victim side 54 of the river to opposite side 59 by a rescuer 58. Directional current flow 60 (illustrated by arrows) flows from left to right in the view of FIG. 3, such that left is "upstream" and right is "downstream". Rescuer 58 secures a line 62 (rope, cable, strap, or similar) to line attachment point 32 on what is the "upstream" end 14 of board 10 by virtue of the current's direction, and places board 10 in river 50 with fin 30 generally aligned with the current. The board need not be thrown, and the rescuer need not enter the water.

In practice, board 10 placed in river 50 by rescuer 58, with a line 62 as described above, has been found to automatically "track" across river 50 on a roughly diagonal path 70 as long as rescuer 58 maintains some tension on line 62 as he pays out the line. When board 10 reaches side 58, a victim 52 gets on the board, or gets in the water holding onto handles 38, and/or ties or clips himself to the board using equipment and instructions floated across to him on the board. Rescuer 58 pulls the victim 52 across the river with board 10, using line 62, and then places board 10 back in the water to return across river 50 to rescue another victim.

Rescuer 58 does not need to enter the water in most cases, or can stand in shallow and relatively safe water near rescuer side 59. A single rescuer is sufficient, and a single rescuer could rescue several victims. Board 10 is lightweight and portable and can be deployed in seconds by a single person.

FIG. 4 shows alternate positions (phantom lines) for the rescuer 58 and victims 52 reversed relative to the direction of the river's current. The only difference in the manner of use is that line 62 is secured to the other line attachment point at the other end of board 10, which is now the "upstream" end.

Board 10 can be shaped and sized to support different numbers of people and different types of equipment, and it is believed possible to make a "board" capable of functioning as a ferry for groups of people and/or heavy equipment or even vehicles.

It will be understood that the disclosed embodiments are representative of presently preferred examples of how to make and use the claimed invention, but are intended to be explanatory rather than limiting of the scope of the invention as defined by the claims below. Variations and modifications of the illustrated examples in the foregoing written specification and drawings may be possible without departing from the scope of the invention as defined in the claims below. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention is accordingly defined by the following claims.

What is claimed:

1. A river-crossing board comprising:
   a generally planar board body comprising a first end, a second end, a victim side, a rescuer side opposite the victim side, a centerline extending between the ends, an upper surface and a lower surface, wherein the sides are longer than the ends;
   an offset current-tracking fin on only the victim side of the board and not on the rescuer side of the board, comprising a longitudinal fin on the lower surface of the board body generally parallel to the centerline and offset from the centerline toward the victim side;
   offset rescue line attachment means on only the rescuer side of the board and not on the victim side of the board, comprising first and second rescue line attachment points on the board body adjacent the first and second ends and offset from the centerline toward the rescuer side.

2. The board of claim 1, wherein the rescue line attachment points are located on the upper surface of the board body.

3. The board of claim 1, wherein each of the rescue line attachment points comprises an eyelet comprising a body set at an angle approximately 45-degrees to the centerline.

4. The board of claim 1, wherein the board body is substantially symmetrical.

5. The board of claim 1, wherein the board has sufficient flotation and size to float a single person.

6. The board of claim 1, wherein the board has sufficient flotation and size to float a plurality of persons.

7. The board of claim 1, wherein the board has sufficient flotation and size to float heavy equipment or vehicles.

8. The board of claim 1, further comprising a line releasably attached to one of the rescue line attachment points.

9. The board of claim 1, wherein the longitudinal current-tracking fin extends over half or more of a longitudinal length of the board.

10. The board of claim 1, wherein the board has a length measured between the ends, and a widest width measured between the sides, and the length is greater than the widest width.

11. The board of claim 1, wherein the first and second ends of the board are substantially identical and capable of functioning as a leading end of the board when tracking through water.

12. The board of claim 1, wherein the board body is substantially rectangular.

13. A river-crossing board having a generally planar board body comprising a first end, a second end, a victim side, a rescuer side opposite the victim side, a centerline extending between the ends, an upper surface and a lower surface, the sides being longer than the ends, the improvement comprising offset, asymmetrical current-tracking means on the board consisting of:

an offset current-tracking fin means on the lower surface of the victim side of the board, comprising a longitudinal fin on the lower surface of the board body generally parallel to the centerline and offset from the centerline toward the victim side;

offset rescue line attachment means on the rescuer side of the board, comprising first and second rescue line attachment points on the board body adjacent the first and second ends and offset from the centerline toward the rescuer side.

14. The board of claim 13, wherein the rescue line attachment points are located on the upper surface of the board body.

* * * * *